US012747674B2

(12) United States Patent
Tanaka et al.

(10) Patent No.: US 12,747,674 B2
(45) Date of Patent: Sep. 29, 2026

(54) TURBOCHARGER

(71) Applicant: IHI Corporation, Tokyo (JP)

(72) Inventors: Takahiro Tanaka, Tokyo (JP); Akihiro Ueda, Tokyo (JP)

(73) Assignee: IHI Corporation, Tokyo (JP)

( * ) Notice: Subject to any disclaimer, the term of this patent is extended or adjusted under 35 U.S.C. 154(b) by 14 days.

(21) Appl. No.: 19/189,575

(22) Filed: Apr. 25, 2025

(65) Prior Publication Data

US 2025/0250910 A1 Aug. 7, 2025

Related U.S. Application Data

(63) Continuation of application No. PCT/JP2023/040784, filed on Nov. 13, 2023.

(30) Foreign Application Priority Data

Feb. 3, 2023 (JP) ................................ 2023-015246

(51) Int. Cl.
*F01D 25/16* (2006.01)

(52) U.S. Cl.
CPC ........ *F01D 25/162* (2013.01); *F05D 2220/40* (2013.01); *F05D 2240/54* (2013.01); *F05D 2250/36* (2013.01); *F05D 2260/98* (2013.01)

(58) Field of Classification Search
CPC ....................................................... F16C 17/26
See application file for complete search history.

(56) References Cited

U.S. PATENT DOCUMENTS

| | | | | |
|---|---|---|---|---|
| 8,794,905 | B2 * | 8/2014 | Matsuyama | F01D 25/186 415/231 |
| 10,316,742 | B2 * | 6/2019 | Hettinger | F02C 6/12 |
| 2016/0252134 | A1 | 9/2016 | Koda et al. | |
| 2017/0276233 | A1 | 9/2017 | Nishioka et al. | |
| 2017/0328273 | A1 | 11/2017 | Hettinger et al. | |

(Continued)

FOREIGN PATENT DOCUMENTS

| | | |
|---|---|---|
| JP | 60-043137 U | 3/1985 |
| JP | 61-202646 U | 12/1986 |

(Continued)

OTHER PUBLICATIONS

International Search Report issued Jan. 23, 2024 in PCT/JP2023/040784 filed on Nov. 13, 2023, 2 pages.

*Primary Examiner* — Courtney D Heinle
*Assistant Examiner* — Danielle M. Christensen
(74) *Attorney, Agent, or Firm* — Oblon, McClelland, Maier & Neustadt, L.L.P.

(57) ABSTRACT

A turbocharger includes a shaft, a rolling bearing that includes an inner ring and an outer ring, a housing that includes a bearing hole and a side wall intersecting the bearing hole, and a bearing retainer that is attached to the side wall and that faces a side face of the outer ring, a lower part of the bearing retainer including a small-radius area, a first distance from a central axis of the shaft to an outer edge of the small-radius area being shorter than a second distance from the central axis to the outer edge of other areas of the bearing retainer, the first distance of the small-radius area being larger than a radius of the bearing hole and less than or equal to a third distance from the central axis to an outer edge of an area facing the small-radius area in the side wall.

12 Claims, 5 Drawing Sheets

(56) References Cited

U.S. PATENT DOCUMENTS

| | | | |
|---|---|---|---|
| 2018/0119572 | A1 | 5/2018 | Uneura |
| 2019/0032515 | A1 | 1/2019 | Nishii et al. |
| 2019/0078732 | A1 | 3/2019 | Kojima et al. |
| 2021/0048069 | A1 | 2/2021 | Uneura et al. |
| 2021/0054879 | A1 | 2/2021 | Uneura et al. |
| 2022/0034238 | A1 | 2/2022 | Maurer et al. |
| 2023/0374998 | A1 | 11/2023 | Tanaka et al. |

FOREIGN PATENT DOCUMENTS

| | | | |
|---|---|---|---|
| JP | 63-92817 | A | 4/1988 |
| JP | 9-158744 | A | 6/1997 |
| JP | 2014-101825 | A | 6/2014 |
| JP | 2015-081542 | A | 4/2015 |
| JP | 6923086 | B2 | 8/2021 |
| JP | 2022-502598 | A | 1/2022 |
| JP | 7107371 | B2 | 7/2022 |
| WO | WO 2016/098230 | A1 | 6/2016 |
| WO | WO 2017/006865 | A1 | 1/2017 |
| WO | WO 2017/149671 | A1 | 9/2017 |
| WO | WO 2017/170753 | A1 | 10/2017 |
| WO | WO 2022/224492 | A1 | 10/2022 |

* cited by examiner

TURBOCHARGER

CROSS REFERENCE TO RELATED APPLICATIONS

This application is a continuation application of International Application No. PCT/JP2023/040784, filed on Nov. 13, 2023, which claims priority to Japanese Patent Application No. 2023-015246 filed on Feb. 3, 2023, the entire contents of which are incorporated herein by reference.

BACKGROUND ART

Technical Field

The present disclosure relates to a turbocharger.

A turbocharger may include a rolling bearing that supports a shaft. For example, a turbocharger of Patent Literature 1 includes a pair of rolling bearings. An outer ring of one of the rolling bearings is positioned by a side wall of a housing, and an outer ring of the other of the rolling bearings is positioned by a wall that is separate from the housing. The rolling bearings are supplied with oil for lubrication.

CITATION LIST

Patent Literature

Patent Literature 1: JP 2015-81542 A

SUMMARY

Technical Problem

In a turbocharger, it is desirable to direct oil efficiently in a discharge direction.

The purpose of the present disclosure is to provide a turbocharger that can direct oil efficiently in a discharge direction.

Solution to Problem

In order to solve the above problem, a turbocharger according to an aspect of the present disclosure includes a shaft, a rolling bearing that includes an inner ring mounted on the shaft and an outer ring arranged around the inner ring, a housing that includes a bearing hole accommodating the rolling bearing and a side wall intersecting the bearing hole, and a bearing retainer that is attached to the side wall and that faces a side face of the outer ring, a lower part of the bearing retainer including a small-radius area, a first distance from a central axis of the shaft to an outer edge of the small-radius area being shorter than a second distance from the central axis to the outer edge of other areas of the bearing retainer, the above first distance of the small-radius area being greater than a radius of the bearing hole and less than or equal to a third distance from the central axis to an outer edge of an area facing the small-radius area in the side wall.

A part of the outer edge of the bearing retainer may be press-fitted into the housing, and the small-radius area may be formed in an area that is not press-fitted into the housing in the bearing retainer.

The small-radius area may include a tapered surface of which radius from the central axis decreases from a first end face that faces the side face of the outer ring to a second end face that is positioned on an opposite side to the first end face.

Effects

According to the present disclosure, oil can be directed efficiently in a discharge direction.

DESCRIPTION OF EMBODIMENTS

An embodiment of the present disclosure will be described in detail below with reference to the accompanying drawings. Specific dimensions, materials, and numerical values described in the embodiments are merely examples for a better understanding, and do not limit the present disclosure unless otherwise specified. In this specification and the drawings, duplicate explanations are omitted for elements having substantially the same functions and configurations by assigning the same sign. Furthermore, elements not directly related to the present disclosure are omitted from the figures.

Figure 1:
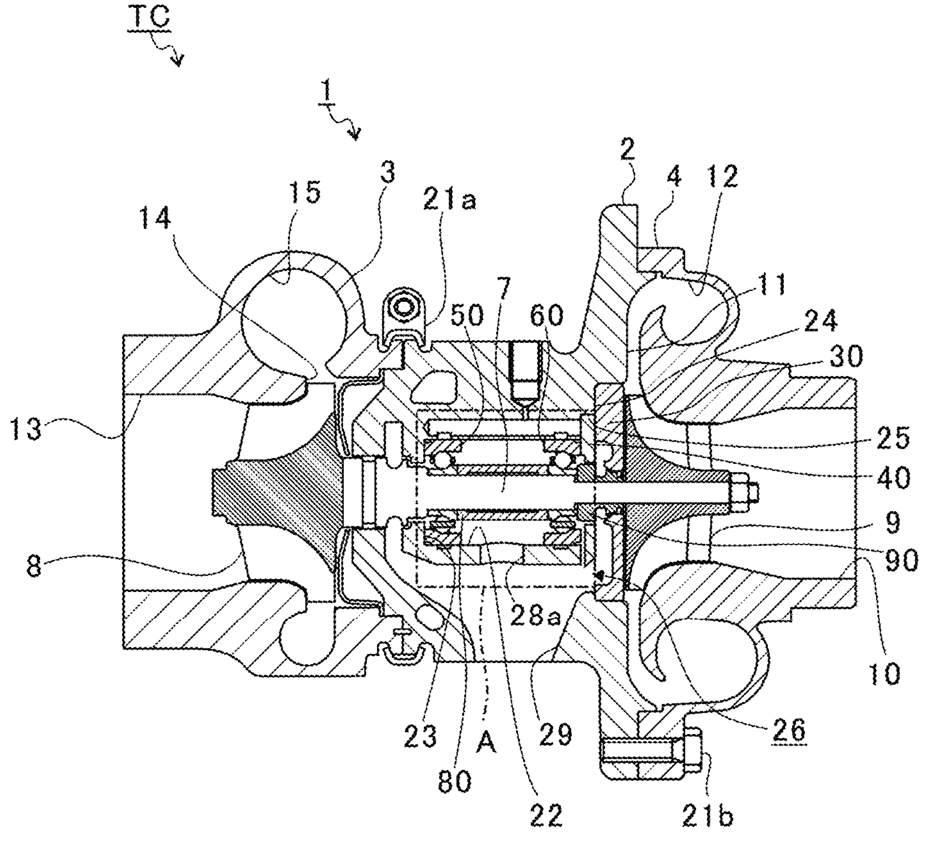
FIG. 1 is a schematic cross-sectional view of a turbocharger according to an embodiment.

FIG. 1 is a schematic cross-sectional view of a turbocharger TC according to an embodiment. For example, the turbocharger TC is applied to an engine. The turbocharger TC includes a housing 1, a shaft 7, a turbine impeller 8, and a compressor impeller 9.

As described below, the shaft 7, the turbine impeller 8, and the compressor impeller 9 rotate integrally with each other. Accordingly, in the present disclosure, an axial direction, a radial direction, and a circumferential direction of the shaft 7, the turbine impeller 8, and the compressor impeller 9 may simply be referred to as the "axial direction," the "radial direction," and the "circumferential direction," respectively, unless otherwise indicated. Furthermore, in the present disclosure, a central axis of the shaft 7, the turbine impeller 8, and the compressor impeller 9 may simply be referred to as the "central axis."

The housing 1 includes a bearing housing 2, a turbine housing 3, and a compressor housing 4. One end of the bearing housing 2 in the axial direction is connected to the turbine housing 3 by a fastening mechanism 21*a* such as a G-coupling. The other end of the bearing housing 2 in the axial direction is connected to the compressor housing 4 by a fastening mechanism 21*b* such as a fastening bolt.

The bearing housing 2 includes a bearing hole 22. The bearing hole 22 extends in the axial direction within the bearing housing 2. The bearing hole 22 has a cylindrical shape.

One end of the bearing hole 22 in the axial direction is defined by a first side wall 23 of the bearing housing 2. The first side wall 23 is located between the turbine impeller 8 and the bearing hole 22 in the axial direction. In the present embodiment, the first side wall 23 is integral with the bearing housing 2. In another embodiment, the first side wall 23 may be a separate part from the bearing housing 2, and may be attached to the bearing housing 2.

The other end of the bearing hole 22 in the axial direction is defined by a bearing retainer 40. The bearing retainer 40 is located between the compressor impeller 9 and the bearing hole 22 in the axial direction. The bearing retainer 40 is a separate part from the bearing housing 2, and is attached to the bearing housing 2.

More specifically, the bearing housing 2 includes a second side wall 24. A seal plate 30 is arranged adjacent to the second side wall 24. A groove 25 is formed in the second side wall 24. In the present embodiment, the bearing retainer 40 is press-fitted into the groove 25.

Figure 2:
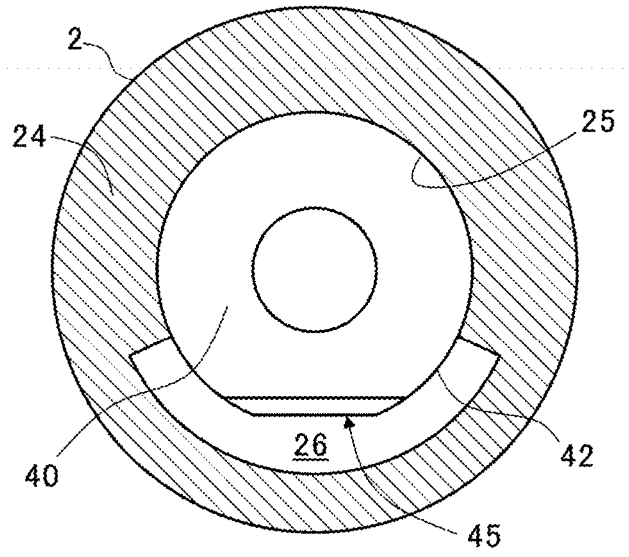
FIG. 2 shows a second side wall of a bearing housing and a bearing retainer seen in an axial direction.

FIG. 2 shows the second side wall 24 of the bearing housing 2 and the bearing retainer 40 seen in the axial direction, wherein the second side wall 24 and the bearing retainer 40 are seen from the right in FIG. 1. In FIG. 2, the second side wall 24 is hatched for better understanding.

As described above, the groove 25 is formed in the second side wall 24. For example, the groove 25 has an arc shape that is greater than 180 degrees when seen in the axial direction. An oil drainage space 26 is formed below the groove 25. The groove 25 and the oil drainage space 26 are continuous with each other in the radial direction. Accordingly, a part of an outer edge 42 of the bearing retainer 40 is press-fitted into the groove 25, while the rest of the outer edge 42 is not press-fitted into the groove 25 and is exposed to the oil drainage space 26.

Figure 3:
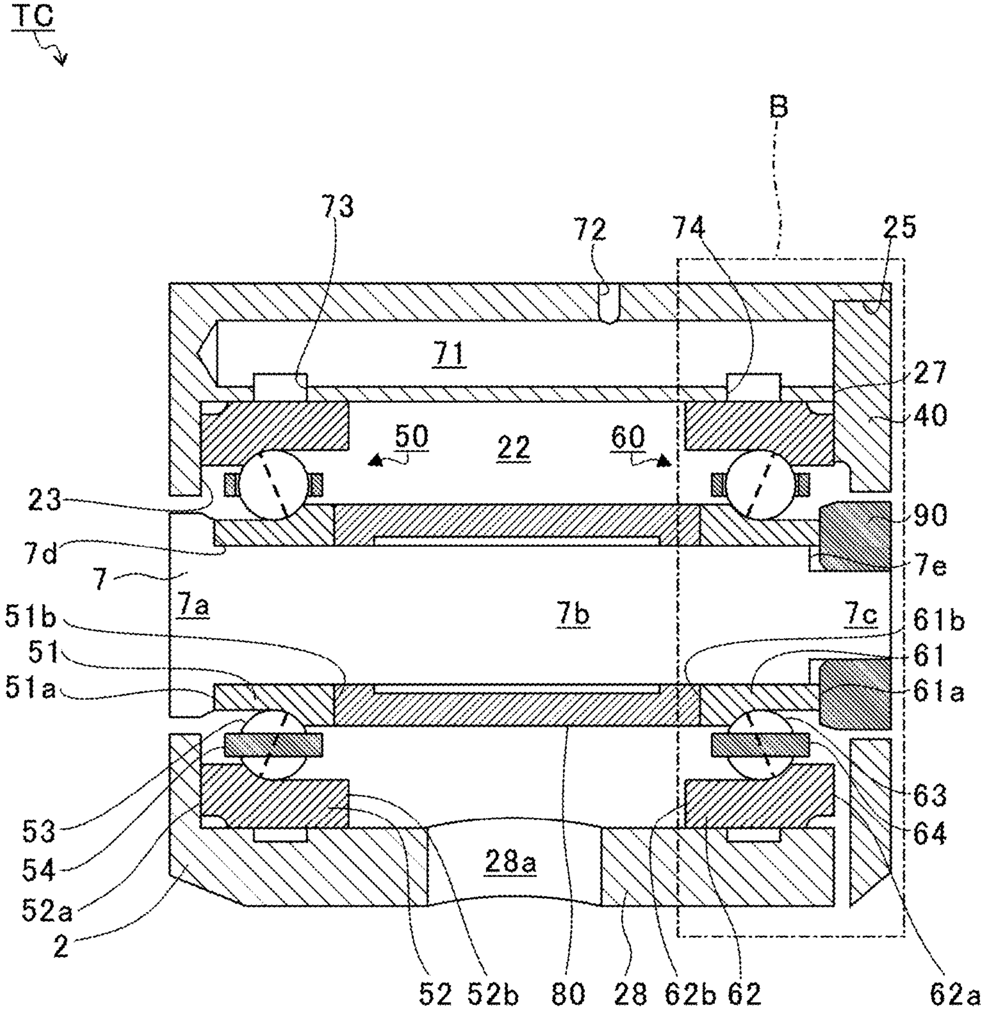
FIG. 3 is a schematic enlarged cross-sectional view of part A in FIG. 1.

FIG. 3 is a schematic enlarged cross-sectional view of part A in FIG. 1. The groove 25 includes a third side wall 27. The third side wall 27 corresponds to a bottom surface of the groove 25. The third side wall 27 extends in the radial direction. The third side wall 27 intersects the bearing hole 22. Specifically, the third side wall 27 may be orthogonal to the bearing hole 22. The bearing retainer 40 is arranged adjacent to the third side wall 27. For example, the bearing retainer 40 contacts the third side wall 27. The bearing retainer 40 is described in more detail below.

Referring to FIG. 1, the bearing hole 22 accommodates a pair of rolling bearings 50 and 60. The rolling bearings 50 and 60 rotatably support the shaft 7. The pair of rolling bearings 50 and 60 are spaced apart from each other in the axial direction. In the present disclosure, the rolling bearing that is adjacent to the first side wall 23 may be referred to as a first rolling bearing 50. In the present disclosure, the rolling bearing that is adjacent to the bearing retainer 40 may be referred to as a second rolling bearing 60.

The turbine impeller 8 is provided at a first end (left end in FIG. 1) of the shaft 7 in the axial direction. The turbine impeller 8 is located outside the bearing hole 22 in the axial direction. The turbine impeller 8 is rotatably accommodated in the turbine housing 3. The turbine impeller 8 rotates integrally with the shaft 7.

The compressor impeller 9 is provided at a second end (right end in FIG. 1) of the shaft 7 in the axial direction. The compressor impeller 9 is located outside the bearing hole 22 in the axial direction. The compressor impeller 9 is rotatably accommodated in the compressor housing 4. The compressor impeller 9 rotates integrally with the shaft 7.

The compressor housing 4 includes an intake opening 10 at an end that is opposite to the bearing housing 2 in the axial direction. The intake opening 10 is connected to an air cleaner (not shown). The bearing housing 2 and the compressor housing 4 define a diffuser flow path 11 therebetween. The diffuser flow path 11 extends in a radial direction. The diffuser flow path 11 has a substantially annular shape. The diffuser flow path 11 is connected to the intake opening 10 via the compressor impeller 9.

The compressor housing 4 includes a compressor scroll flow path 12. The compressor scroll flow path 12 is located outside the compressor impeller 9 in the radial direction. The compressor scroll flow path 12 is connected to the diffuser flow path 11. Furthermore, the compressor scroll flow path 12 is connected to an intake port of an engine (not shown).

As the compressor impeller 9 rotates, air is sucked into the compressor housing 4 from the intake opening 10. The sucked air is accelerated and pressurized by centrifugal force while passing through blades of the compressor impeller 9. The air is further pressurized in the diffuser flow path 11 and the compressor scroll flow path 12. The pressurized air flows out of an outlet (not shown), and is directed to the intake port of the engine (not shown).

The turbine housing 3 includes an exhaust opening 13 at an end that is opposite to the bearing housing 2 in the axial direction. The exhaust opening 13 is connected to an exhaust gas purifier (not shown). The turbine housing 3 includes a flow path 14 and a turbine scroll flow path 15. The turbine scroll flow path 15 is located outside the turbine impeller 8 in the radial direction. The flow path 14 is located between the turbine impeller 8 and the turbine scroll flow path 15. The turbine scroll flow path 15 is connected to the flow path 14. The flow path 14 is connected to the exhaust opening 13 via the turbine impeller 8.

The turbine scroll flow path 15 is connected to a gas inlet (not shown). The gas inlet receives exhaust gas that is discharged from an exhaust manifold of the engine (not shown). The exhaust gas is directed from the gas inlet to the turbine scroll flow path 15, and further directed to the exhaust opening 13 via the flow path 14 and the turbine impeller 8. The exhaust gas rotates the turbine impeller 8 while passing through blades of the turbine impeller 8.

Rotational force of the turbine impeller 8 is transmitted to the compressor impeller 9 via the shaft 7. As the compressor impeller 9 rotates, the air from the intake opening 10 is pressurized as described above. As such, the pressurized air is directed to the intake port of the engine.

Referring to FIG. 3, the bearing housing 2 includes a main oil path 71. The main oil path 71 extends in the axial direction. The main oil path 71 extends parallel to the bearing hole 22. The main oil path 71 is located above the bearing hole 22.

The bearing hole 22 and the main oil path 71 are opened on the third side wall 27. As described above, the bearing retainer 40 contacts the third side wall 27. The bearing retainer 40 closes an opening of the main oil path 71.

The bearing housing 2 includes a through hole 72. The through hole 72 extends from an outer wall of the bearing housing 2 to the main oil path 71. The through hole 72 is connected to the main oil path 71. Oil is supplied to the main oil path 71 from an oil pump (not shown) via the through hole 72.

The bearing housing 2 includes a first oil path 73 and a second oil path 74. Each of the first oil path 73 and the second oil path 74 opens to the main oil path 71. Furthermore, each of the first oil path 73 and the second oil path 74 opens to the bearing hole 22. Each of the first oil path 73 and the second oil path 74 connects the main oil path 71 to the bearing hole 22. The first oil path 73 is provided at a position corresponding to the first rolling bearing 50 in the axial direction, and opens toward the first rolling bearing 50. The second oil path 74 is provided at a position corresponding to the second rolling bearing 60 in the axial direction, and opens toward the second rolling bearing 60.

The bearing housing 2 includes a lower wall 28. The lower wall 28 defines a lower part of the bearing hole 22 in the radial direction. The lower wall 28 includes an oil drain hole 28*a*. The oil drain hole 28*a* passes through the lower wall 28 in a vertical direction. For example, the oil drain hole 28*a* is located between the first oil path 73 and the second oil path 74 in the axial direction. In another aspect, the oil drain hole 28*a* is located between the first rolling bearing 50 and the second rolling bearing 60 in the axial direction.

Referring to FIG. 1, the bearing housing 2 includes an oil outlet 29 below the oil drain hole 28*a*. The oil outlet 29 directs oil to an outside of the bearing housing 2.

Referring to FIG. 3, the bearing hole 22 accommodates a part of the shaft 7. The shaft 7 includes a large-diameter portion 7*a*, a medium-diameter portion 7*b*, and a small-diameter portion 7*c*. In the axial direction, the medium-diameter portion 7*b* is located between the first side wall 23 and the bearing retainer 40. In the axial direction, the large-diameter portion 7*a* is located between the first end of the shaft 7 and the medium-diameter portion 7*b*. In the axial direction, the small-diameter portion 7*c* is located between the second end of the shaft 7 and the medium-diameter portion 7*b*. A diameter of the medium-diameter portion 7*b* is smaller than a diameter of the large-diameter portion 7*a*. A diameter of the small-diameter portion 7*c* is smaller than the diameter of the medium-diameter portion 7*b*.

The shaft 7 includes a first step surface 7*d* and a second step surface 7*e*. In the axial direction, the first step surface 7*d* is located between the large-diameter portion 7*a* and the medium-diameter portion 7*b*. The first step surface 7*d* extends in the radial direction from an outer surface of the large-diameter portion 7*a* to an outer surface of the medium-diameter portion 7*b*. In the axial direction, the second step surface 7*e* is located between the medium-diameter portion 7*b* and the small-diameter portion 7*c*. The second step surface 7*e* extends in the radial direction from the outer surface of the medium-diameter portion 7*b* to an outer surface of the small-diameter portion 7*c*.

The first rolling bearing 50 includes an inner ring 51, an outer ring 52, a plurality of rolling elements 53, and a cage 54. The inner ring 51 is mounted on the outer surface of the medium-diameter portion 7*b* of the shaft 7. The inner ring 51 rotates integrally with the shaft 7. The outer ring 52 is arranged outside the inner ring 51 in the radial direction. An outer surface of the outer ring 52 faces an inner surface of the bearing hole 22. The plurality of rolling elements 53 are disposed between the inner ring 51 and the outer ring 52. The cage 54 holds the plurality of rolling elements 53.

The second rolling bearing 60 includes an inner ring 61, an outer ring 62, a plurality of rolling elements 63, and a cage 64. The inner ring 61 is mounted on the outer surface of the medium-diameter portion 7*b* of the shaft 7. The inner ring 61 rotates integrally with the shaft 7. The outer ring 62 is arranged outside the inner ring 61 in the radial direction. An outer surface of the outer ring 62 faces the inner surface of the bearing hole 22. The plurality of rolling elements 63 are arranged between the inner ring 61 and the outer ring 62. The cage 64 holds the plurality of rolling elements 63.

In the present disclosure, among side faces 51*a*, 51*b*, 61*a* and 61*b* of the inner ring 51 of the first rolling bearing 50 and the inner ring 61 of the second rolling bearing 60, the side faces 51*b* and 61*b* that face each other in the axial direction may be referred to as "inner side face," and the side faces 51*a* and 61*a* that are opposite to the inner side faces 51*b* and 61*b* may be referred to as "outer side face."

Similarly, in the present disclosure, among the side faces 52*a*, 52*b*, 62*a* and 62*b* of the outer ring 52 of the first rolling bearing 50 and the outer ring 62 of the second rolling bearing 60, the side faces 52*b* and 62*b* that face each other in the axial direction may be referred to as "inner side face," and the side faces 52*a* and 62*a* that are opposite to the inner side faces 52*b* and 62*b* may be referred to as "outer side face."

The outer side face 51*a* of the inner ring 51 of the first rolling bearing 50 contacts the first stepped surface 7*d* of the shaft 7 in the axial direction. Furthermore, the outer side face 52*a* of the outer ring 52 of the first rolling bearing 50 faces the first side wall 23 of the bearing housing 2 in the axial direction.

A spacer 80 is arranged on the medium-diameter portion 7*b* of the shaft 7 between the inner ring 51 and the inner ring 61. The spacer 80 has a substantially cylindrical shape. The shaft 7 is inserted into the spacer 80. In another embodiment, a spring and a spring receiver may be provided instead of the spacer 80.

The inner side face 51*b* of the inner ring 51 of the first rolling bearing 50 contacts one end of the spacer 80 in the axial direction. The inner side face 61*b* of the inner ring 61 of the second rolling bearing 60 contacts the other end of the spacer 80 in the axial direction.

An oil thrower 90 is mounted on the small-diameter portion 7*c* of the shaft 7. The oil thrower 90 splashes oil radially outward. The oil thrower 90 is arranged inside the bearing retainer 40 in the radial direction. The oil thrower 90 is spaced apart from the bearing retainer 40 in the radial direction.

The outer side face 61*a* of the inner ring 61 of the second rolling bearing 60 contacts the oil thrower 90 in the axial direction. Furthermore, the outer side face 62*a* of the outer ring 62 of the second rolling bearing 60 faces the bearing retainer 40 in the axial direction.

Referring to FIG. 1, during assembly, the first rolling bearing 50, the spacer 80, the second rolling bearing 60, and the oil thrower 90 are mounted on the shaft 7 from the second end of the shaft 7 (right end in FIG. 1) in this order. The bearing retainer 40 and the seal plate 30 are subsequently assembled into the bearing housing 2. The compressor impeller 9 is then mounted on the shaft 7. An axial compressive stress is applied to the inner ring 51 of the first rolling bearing 50, the spacer 80, the inner ring 61 of the second rolling bearing 60, the oil thrower 90 and the compressor impeller 9 by a fastening bolt attached to the second end of the shaft 7, thereby securing those components to the shaft 7. As a result, the inner ring 51 of the first rolling bearing 50, the spacer 80, the inner ring 61 of the second rolling bearing 60, the oil thrower 90 and the compressor impeller 9 rotate integrally with the shaft 7.

Referring to FIG. 3, when a thrust load is applied on the shaft 7 toward the turbine impeller 8 (leftward thrust load in FIG. 3), the outer ring 52 of the first rolling bearing 50 is pressed against the first side wall 23. Accordingly, the first side wall 23 restricts axial movement of the outer ring 52. Furthermore, when a thrust load is applied on the shaft 7 toward the compressor impeller 9 (rightward thrust load in FIG. 3), the outer ring 62 of the second rolling bearing 60 is pressed against the bearing retainer 40. Accordingly, the bearing retainer 40 restricts axial movement of the outer ring 62. According to the above configuration, movement of the shaft 7 due to the thrust loads is restricted by the first side wall 23 and the bearing retainer 40.

In the present embodiment, the turbocharger TC does not include rotation stoppers for the outer rings 52 and 62. When the outer ring 52 is not pressed against the first side wall 23, the outer ring 52 can rotate in the circumferential direction with respect to the bearing housing 2. Similarly, when the outer ring 62 is not pressed against the bearing retainer 40, the outer ring 62 can rotate in the circumferential direction with respect to the bearing housing 2. As the shaft 7 rotates, the inner rings 51 and 61 rotate integrally with the shaft 7. As the inner rings 51 and 61 rotate, the rolling elements 53 and 63 rotate. The rolling elements 53 and 63 move in the circumferential direction. As the rolling elements 53 and 63 rotate and move, or as the oil flows, the outer rings 52 and 62 rotate in the circumferential direction. Rotational speed of the outer ring 52 is slower than that of the inner ring 51. Furthermore, in the present embodiment, the pair of rolling bearings 50 and 60 are arranged in Front-to-Front. Accordingly, no spacer is needed between the outer ring 52 and the outer ring 62. As such, no preload is applied to the outer rings 52 and 62. Thus, the outer rings 52 and 62 are likely to rotate with respect to the bearing housing 2.

Next, the bearing retainer 40 will be described in detail.

Figure 4:
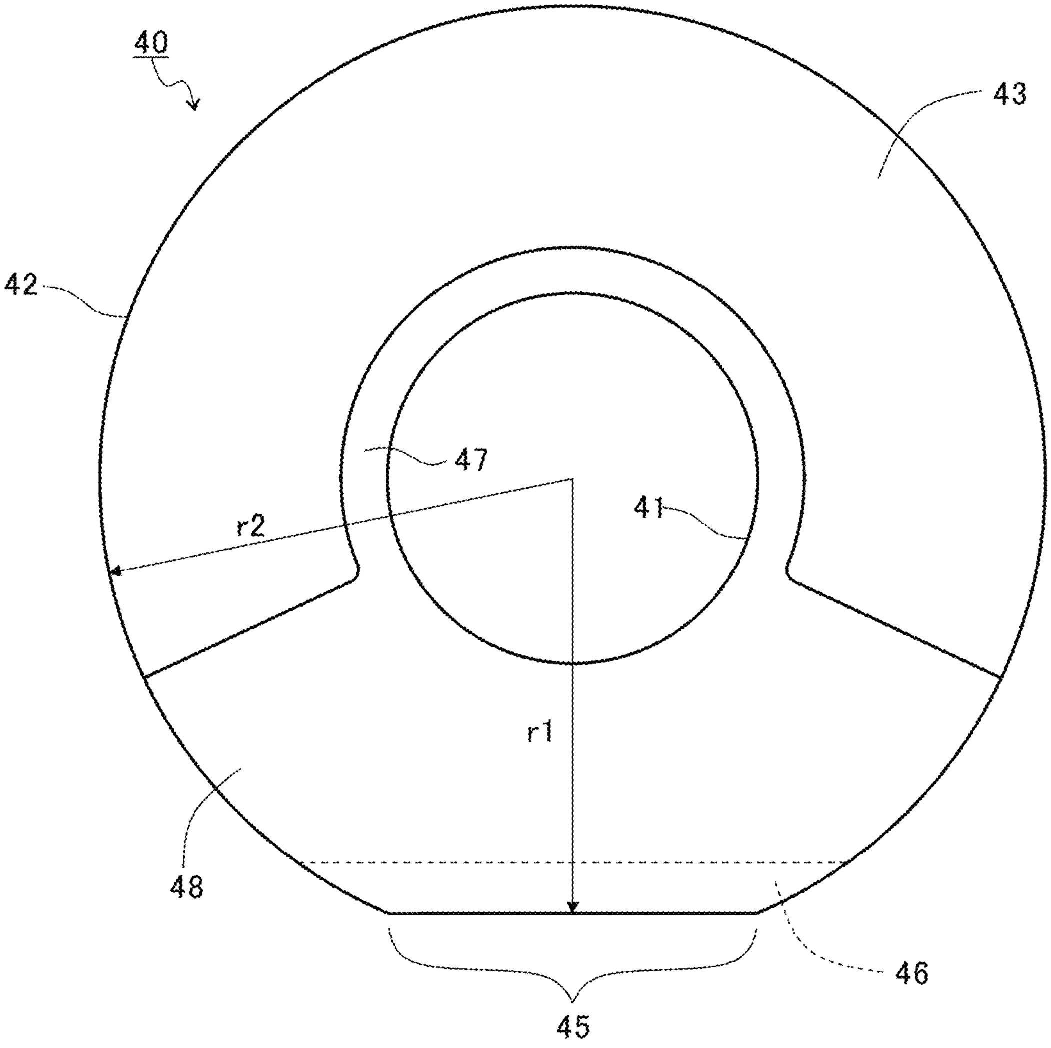
FIG. 4 is a schematic plan view showing the bearing retainer.

FIG. 4 is a schematic plan view of the bearing retainer 40, wherein the bearing retainer 40 is seen from the left in FIG. 1 in the axial direction. The bearing retainer 40 has a substantially annular or disk shape. The bearing retainer 40 is arranged concentric with the shaft 7 (not shown in FIG. 4). The bearing retainer 40 includes an inner edge 41 and an outer edge 42. The inner edge 41 has a circular shape when seen in the axial direction. The outer edge 42 has a substantially circular shape when seen in the axial direction. A lower part of the outer edge 42 has a noncircular shape (described in detail below).

Figure 5:
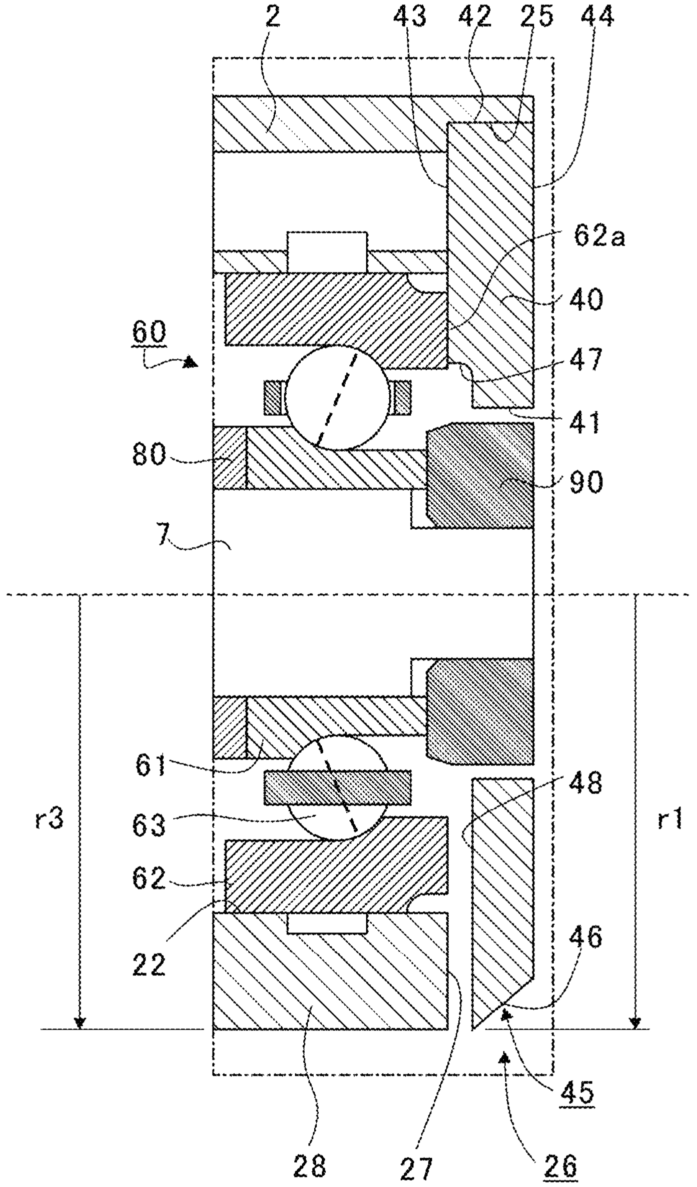
FIG. 5 is a schematic enlarged cross-sectional view of part B in FIG. 3.

FIG. 5 is a schematic enlarged cross-sectional view of part B in FIG. 3. For example, a diameter of the inner edge 41 is smaller than an innermost diameter of the outer ring 62 of the second rolling bearing 60, and is larger than an outer diameter of the oil thrower 90. A diameter of the outer edge 42 is larger than an inner diameter of the bearing hole 22.

The bearing retainer 40 includes a first end face 43 and a second end face 44 in the axial direction. The first end face 43 defines the end of the bearing hole 22 in the axial direction. The first end face 43 contacts the third side wall 27 of the bearing housing 2. Note that although the first end face 43 contacts the third side wall 27, an oil drainage surface 48 (described below) is spaced apart from the third side wall 27 in the axial direction. Furthermore, the first end face 43 directly faces the outer side face 62*a* of the outer ring 62 of the second rolling bearing 60 in the axial direction. In other words, no other member is arranged between the first end face 43 and the outer side face 62*a* in the axial direction. The second end face 44 is positioned on an opposite side to the first end face 43 in the axial direction.

Referring to FIG. 4, a lower portion of the bearing retainer 40 includes a small-radius area 45. A distance (first distance) r1 from the central axis to the outer edge 42 of the small-radius area 45 is shorter than a distance (second distance) r2 from the central axis to the outer edge 42 of other areas of the bearing retainer 40. In the present embodiment, the outer edge 42 of the small-radius area 45 has a horizontal straight shape when seen in the axial direction. In another embodiment, the outer edge 42 of the small-radius area 45 may have another shape, such as a curved shape, when seen in the axial direction.

Referring to FIG. 5, the above-described distance r1 of the small-radius area 45 is greater than a radius of the bearing hole 22. Furthermore, the distance r1 is less than or equal to a distance (third distance) r3 from the central axis to an outer edge of an area that faces the small-radius area 45 in the third side wall 27. In the present embodiment, the distance r1 is equal to the distance r3. In another embodiment, the distance r1 may be less than the distance r3.

Referring to FIG. 2, the groove 25 of the housing 2 has an arc shape, as described above. Accordingly, a part of the outer edge 42 of the bearing retainer 40 is press-fitted into the groove 25, and the rest of the outer edge 42 is not press-fitted into the groove 25. In the bearing retainer 40, the small-radius area 45 is formed in an area that is not press-fitted into the housing 2. In other words, the small-radius area 45 is formed in the bearing retainer 40 in an area that does not overlap with the groove 25 in the circumferential direction.

Referring to FIG. 5, the small-radius area 45 includes a tapered surface 46. Specifically, the tapered surface 46 is formed on an outer circumferential surface of the bearing retainer 40. The tapered surface 46 is inclined with respect to the axial direction. A radius of the tapered surface 46 from the central axis decreases from the first end face 43 to the second end face 44. In the present embodiment, the tapered surface 46 is a plane surface. In another embodiment, the tapered surface 46 may be a curved surface.

For example, the small-radius area 45 and the tapered surface 46 may be formed by cutting the lower part of the annular bearing retainer 40. The small-radius area 45 and the tapered surface 46 are not limited thereto, and may be formed by another method. For example, the small-radius area 45 and the tapered surface 46 may be formed simultaneously with other portions of the bearing retainer 40.

Referring to FIG. 4, an oil groove 47 and the oil drainage surface 48 are formed on the first end face 43. In the present embodiment, the oil groove 47 is formed continuously to the inner edge 41. For example, the oil groove 47 is formed with a predetermined width from the inner edge 41 in the radial direction. The oil groove 47 extends along the circumferential direction. In the present embodiment, the oil groove 47 is continuous throughout the circumferential direction, and has an annular shape. The oil groove 47 is formed integrally with the oil drainage surface 48 at a lower part.

The oil drainage surface 48 is provided in a lower area of the first end face 43. The oil drainage surface 48 has a fan shape that is concentric with the shaft 7 when seen from the axial direction.

Next, an oil flow around the second rolling bearing 60 will be described.

Referring to FIG. 3, oil is supplied from an oil pump (not shown) to the main oil path 71 via the through hole 72. A part of the oil is supplied to the first rolling bearing 50 via the first oil path 73, and the rest of the oil is supplied to the second rolling bearing 60 via the second oil path 74.

Referring to FIG. 5, the oil supplied to the second rolling bearing 60 is used for lubrication between the inner ring 61 and the rolling elements 63, and lubrication between the outer ring 62 and the rolling elements 63. The oil is also used for lubrication between the outer ring 62 and the inner surface of the bearing hole 22. The oil is directed to the oil groove 47 and the oil drainage surface 48 from a gap between the outer ring 62 and the bearing retainer 40, and a gap between the outer ring 62 and the inner ring 61.

A part of the oil in the oil groove 47 is directed circumferentially by the oil groove 47. The oil is directed from the oil groove 47 to the oil drain surface 48. The oil drainage surface 48 further directs the oil downward. The oil falls into the oil drainage space 26.

The rest of the oil in the oil groove 47 is directed to the second end face 44 via a gap between the bearing retainer 40 and the oil thrower 90. The second end face 44 further directs the oil downward. The oil falls into the oil drain space 26. The oil in the oil drainage space 26 is collected at the oil outlet 29 (not shown in FIG. 5), and discharged to the outside.

The turbocharger TC as described above includes the shaft 7, the second rolling bearing 60 that includes the inner ring 61 mounted on the shaft 7 and the outer ring 62 arranged around the inner ring 61, the bearing housing 2 that includes the bearing hole 22 accommodating the second rolling bearing 60 and the third side wall 27 intersecting the bearing hole 22, the bearing retainer 40 that is attached to the third side wall 27 and that directly faces the outer side face 62*a* of the outer ring 62. The lower part of the bearing retainer 40 includes the small-radius area 45. The distance r1 from the central axis to the outer edge 42 of the small-radius area 45 is shorter than the distance r2 from the central axis to the outer edge 42 of other areas of the bearing retainer 40. Furthermore, the distance r1 of the small-radius area 45 is greater than the radius of the bearing hole 22, and is less than or equal to the distance r3 from the central axis to the outer edge of the third side wall 27 that faces the small-radius area 45. According to such a configuration, the bearing retainer 40 does not protrude downward from the third side wall 27, since the distance r1 of the small-radius area 45 is less than or equal to the distance r3 from the central axis to the outer edge of the third side wall 27. As a result, the oil drain space 26 is secured larger, and the oil flowing on the second end face 44 can easily pass through the oil drain space 26. As such, oil can be directed efficiently in the discharge direction.

Furthermore, according to the above configuration, the distance r1 of the small-radius area 45 is larger than the radius of the bearing hole 22. Accordingly, the small-radius area 45 can seal the gap between the bearing hole 22 and the outer ring 62 from the axial direction, while securing the oil drainage space 26 larger. If the small-radius area 45 is too short and this gap is not sealed by the small-radius area 45, oil will splash from this gap in the axial direction. This oil will interfere with the downward flow of the oil flowing on the second end face 44. However, according to the above configuration, the oil splashing from the gap between the bearing hole 22 and the outer ring 62 in the axial direction is received by the bearing retainer 40. As such, the downward flow of the oil flowing on the second end face 44 is not interfered. As a result, the oil can be directed more efficiently in the discharge direction.

Furthermore, according to the above configuration, the small-radius area 45 is positioned in a vertically lower part. Accordingly, when assembling the bearing retainer 40 to the bearing housing 2, the small-radius area 45 can be used as a positioning marker in the circumferential direction. As a result, no additional marker is required for the bearing retainer 40.

Furthermore, in the turbocharger TC, a part of the outer edge 42 of the bearing retainer 40 is press-fitted into the bearing housing 2, and the small-radius area 45 is formed in the area that is not press-fitted into the bearing housing 2 in the bearing retainer 40. According to such a configuration, the small-radius area 45 can be formed with avoiding deformation of the bearing retainer 40 due to the press-fitting.

Furthermore, in the turbocharger TC, the small-radius area 45 includes the tapered surface 46 of which radius from the central axis decreases from the first end face 43 that faces the outer side face 62*a* of the outer ring 62 to the second end face 44 that is positioned on an opposite side to the first end face 43. According to such a configuration, the oil directed to the second end face 44 flows on the tapered surface 46. The oil flowing on the tapered surface 46 smoothly merges with the oil flowing on the oil drain surface 48. As such, the oil can be directed more efficiently in the discharge direction.

Although an embodiment of the present disclosure has been described above with reference to the accompanying drawings, the present disclosure is not limited thereto. It is obvious that a person skilled in the art can conceive of various examples of variations or modifications within the scope of the claims, which are also understood to belong to the technical scope of the present disclosure.

For example, in the above embodiment, the bearing retainer 40 is press-fitted into the groove 25 of the bearing housing 2. In another embodiment, for example, the bearing retainer 40 may be fixed to the third side wall 27 of the bearing housing 2 by bolts or the like.

Furthermore, in the above embodiment, the bearing retainer 40 includes the tapered surface 46. However, the tapered surface 46 is not essential.

Furthermore, in the above embodiment, the bearing retainer 40 is applied to the second rolling bearing 60 that is closer to the compressor impeller 9. In another embodiment, the bearing retainer 40 may be applied to the first rolling bearing 50 that is closer to the turbine impeller 8.

Furthermore, in the above embodiment, the turbocharger TC includes two rolling bearings 50 and 60. In another embodiment, the turbocharger TC may include three or more rolling bearings.

In the above embodiment, the outer rings 52 and 62 are rotatable with respect to the bearing housing 2. In another embodiment, the outer rings 52 and 62 may be fixed to the bearing housing 2 in the rotational direction.

In the above embodiment, the pair of rolling bearings 50 and 60 are angular bearings. In another embodiment, the rolling bearing may be another rolling bearing other than the angular bearing (e.g., deep groove ball bearing or spherical ball bearing). Furthermore, in the above embodiment, the pair of rolling bearings 50 and 60 are arranged in Front-to-Front. In another embodiment, the pair of rolling bearings 50 and 60 may be arranged in Back-to-Back.

The present disclosure can reduce leakage of oil into intake air and expedite cleaning of exhaust gas, thus contributing to Sustainable Development Goals (SDGs), Goal 13 "Take urgent action to combat climate change and its impacts."

What is claimed is:

1. A turbocharger comprising:

a shaft;

a rolling bearing that includes an inner ring mounted on the shaft and an outer ring arranged around the inner ring;

a housing that includes a bearing hole accommodating the rolling bearing and a side wall intersecting the bearing hole; and a bearing retainer that is attached to the side wall and that faces a side face of the outer ring, a lower part of the bearing retainer including a small-radius area, a first distance from a central axis of the shaft to an outer edge of the small-radius area being shorter than a second distance from the central axis to the outer edge of other areas of the bearing retainer, the first distance of the small-radius area being greater than a radius of the bearing hole and less than or equal to a third distance from the central axis to an outer edge of an area facing the small-radius area in the side wall, wherein the outer edge of the small-radius area has a horizontal straight shape when seen in an axial direction of the shaft, the bearing retainer further includes a non-small-radius area that is an area other than the small-radius area, a radius from the central axis to an outer edge of the non-small-radius area is constant, and the outer edge of the small-radius area and the outer edge of the non-small-radius area are formed continuously.

2. The turbocharger according to claim 1, wherein a part of the outer edge of the bearing retainer is press-fitted into the housing, and the small-radius area is formed in an area that is not press-fitted into the housing in the bearing retainer.

3. The turbocharger according to claim 1, wherein the small-radius area includes a tapered surface of which radius from the central axis decreases from a first end face that faces the side face of the outer ring to a second end face that is positioned on an opposite side to the first end face.

4. The turbocharger according to claim 1, wherein the bearing retainer further incudes an oil drainage surface, a thickness of the bearing retainer at the oil drainage surface in an axial direction of the shaft is smaller than that of other areas of the bearing retainer, and the outer edge of the small-radius area is positioned within an outer edge of the oil drainage surface.

5. A turbocharger comprising:

a shaft;

a rolling bearing that includes an inner ring mounted on the shaft and an outer ring arranged around the inner ring;

a housing that includes a bearing hole accommodating the rolling bearing and a side wall intersecting the bearing hole; and a bearing retainer that is attached to the side wall and that faces a side face of the outer ring, a lower part of the bearing retainer including a small-radius area, a first distance from a central axis of the shaft to an outer edge of the small-radius area being shorter than a second distance from the central axis to the outer edge of other areas of the bearing retainer, the first distance of the small-radius area being greater than a radius of the bearing hole and less than or equal to a third distance from the central axis to an outer edge of an area facing the small-radius area in the side wall, wherein the bearing retainer further includes an oil drainage surface, a thickness of the bearing retainer at the oil drainage surface in an axial direction of the shaft is smaller than that of other areas of the bearing retainer, and the outer edge of the small-radius area is positioned within an outer edge of the oil drainage surface.

6. The turbocharger according to claim 5, wherein a part of the outer edge of the bearing retainer is press-fitted into the housing, and the small-radius area is formed in an area that is not press-fitted into the housing in the bearing retainer.

7. The turbocharger according to claim 5, wherein the small-radius area includes a tapered surface of which radius from the central axis decreases from a first end face that faces the side face of the outer ring to a second end face that is positioned on an opposite side to the first end face.

8. The turbocharger according to claim 5, wherein the outer edge of the small-radius area has a horizontal straight shape when seen in an axial direction of the shaft.

9. A turbocharger comprising:

a shaft;

a rolling bearing that includes an inner ring mounted on the shaft and an outer ring arranged around the inner ring;

a housing that includes a bearing hole accommodating the rolling bearing and a side wall intersecting the bearing hole; and a bearing retainer that is attached to the side wall and that faces a side face of the outer ring, a lower part of the bearing retainer including a small-radius area, a first distance from a central axis of the shaft to an outer edge of the small-radius area being shorter than a second distance from the central axis to the outer edge of other areas of the bearing retainer, the first distance of the small-radius area being greater than a radius of the bearing hole and less than or equal to a third distance from the central axis to an outer edge of an area facing the small-radius area in the side wall, wherein the housing further includes:

a groove having an arc shape that is greater than 180 degrees when seen in an axial direction of the shaft; and an oil drainage space that is formed below the groove, a distance from the central axis to an outer circumferential surface of the oil drainage space being larger than a distance from the central axis to an outer circumferential surface of the groove, the bearing retainer further includes a non-small-radius area that is an area other than the small-radius area, a part of the non-small-radius area is press-fitted into the groove, and the small-radius area and the rest of the non-small-radius area are exposed to the oil drainage space.

10. The turbocharger according to claim 9, wherein the small-radius area includes a tapered surface of which radius from the central axis decreases from a first end face that faces the side face of the outer ring to a second end face that is positioned on an opposite side to the first end face.

11. The turbocharger according to claim 9, wherein the outer edge of the small-radius area has a horizontal straight shape when seen in an axial direction of the shaft.

12. The turbocharger according to claim 9, wherein the bearing retainer further incudes an oil drainage surface, a thickness of the bearing retainer at the oil drainage surface in an axial direction of the shaft is smaller than that of other areas of the bearing retainer, and the outer edge of the small-radius area is positioned within an outer edge of the oil drainage surface.

* * * * *